(12) United States Patent
Uenoyama (10) Patent No.: US 8,138,752 B2
(45) Date of Patent: Mar. 20, 2012

(54) ROTATION DETECTION APPARATUS

(75) Inventor: Hirofumi Uenoyama, Kitanagoya (JP)

(73) Assignee: DENSO CORPORATION, Kariya (JP)

( * ) Notice: Subject to any disclaimer, the term of this patent is extended or adjusted under 35 U.S.C. 154(b) by 445 days.

(21) Appl. No.: 12/385,091

(22) Filed: Mar. 31, 2009

(65) Prior Publication Data

US 2009/0251134 A1  Oct. 8, 2009

(30) Foreign Application Priority Data

Apr. 3, 2008 (JP) ................................. 2008-97537

(51) Int. Cl.
*G01B 7/30* (2006.01)
(52) U.S. Cl. .............................. 324/207.25; 324/207.21
(58) Field of Classification Search ... 324/207.2–207.25
See application file for complete search history.

(56) References Cited

U.S. PATENT DOCUMENTS

| | | | |
|---|---|---|---|
| 5,869,962 A * | 2/1999 | Kasumi et al. ........... | 324/207.21 |
| 6,366,079 B1 | 4/2002 | Uenoyama | |
| 6,727,689 B1 * | 4/2004 | Furlong et al. ........... | 324/207.25 |
| 7,202,660 B2 * | 4/2007 | Kuroyanagi et al. .... | 324/207.25 |
| 2007/0170912 A1 * | 7/2007 | Kato et al. ................... | 324/160 |
| 2009/0012733 A1 | 1/2009 | Yamada et al. | |

FOREIGN PATENT DOCUMENTS

| | | |
|---|---|---|
| JP | A-6-160427 | 6/1994 |
| JP | A-6-160428 | 6/1994 |
| JP | A-2000-337921 | 12/2000 |
| JP | A-2003-254780 | 9/2003 |
| JP | A-2005-300216 | 10/2005 |

OTHER PUBLICATIONS

Notification of Reason for Refusal mailed on Feb. 23, 2010 issued from the Japanese Patent Office in the corresponding Japanese patent application No. 2008-097537 (with English translation).

* cited by examiner

*Primary Examiner* — Arleen M Vazquez
(74) *Attorney, Agent, or Firm* — Posz Law Group, PLC (57) ABSTRACT

A rotation detection apparatus for detecting a rotation state of a gear is disclosed. The rotation detection apparatus includes a magnetic sensor, a magnetic filed generation unit, and a self-diagnosis unit. The sensor includes: a bias magnet for generating a bias magnetic field extending toward the gear; and a magnetic-electric conversion element for sensing the bias magnetic field acting thereon. When the gear is in a stationary state, the magnetic filed generation unit generates a diagnosis use magnetic field extending toward the magnetic-electric conversion element. The self-diagnosis unit determines whether the magnetic sensor has a failure based on an output from the magnetic-electric conversion element that is subjected to the bias magnetic field and the self-diagnosis use magnetic field.

13 Claims, 8 Drawing Sheets

ROTATION DETECTION APPARATUS

CROSS REFERENCE TO RELATED APPLICATION

The present application is based on Japanese Patent Application No. 2008-97537 filed on Apr. 3, 2008, the disclosure of which is incorporated herein by reference.

BACKGROUND OF THE INVENTION

1. Field of the Invention

The present invention relates to a rotation detection apparatus including a magnetic-electric conversion element to detect a rotation state of a gear.

2. Description of Related Art

Japanese Patent No. 3988316 discloses a magnetic sensor that includes a bias magnet and a sensor chip having a magnetoresistive (MR) element. The bias magnet applies a bias magnetic field to the MR element. The magnetic sensor further includes an electric current conduction part disposed on a substrate on which the MR element is arranged. According to the above magnetic sensor, the electric current is applied to the electric current conduction part to adjust a direction of the bias magnetic field acting on the MR element. It is thereby possible to adjust a sensor output offset, which can result from a bias magnet magnetization variation and a relative positioning error between the MR element and the bias magnet etc.

JP-A-2003-254780 discloses a rotation detection apparatus that has multiple magnetic sensors. The multiple magnetic sensors perform mutual monitoring and self-diagnosis thereof to determine whether the magnetic sensor has a malfunction that fixes an output voltage to a power supply voltage, a ground voltage, a middle voltage or the like.

According to the magnetic sensor disclosed in Japanese Patent No. 3988316, a sensor output offset of the magnetic sensor can be adjusted in accordance with the above-described manner. However, when a detection target object is in a stationary state, the magnetic sensor cannot perform self-diagnosis thereof to determine whether there exist an abnormality, e.g., the decrease in sensitivity or the presence of the offset due to a failure or aging of the MR element and the bias magnet.

According to the rotation detection apparatus disclosed in JP-A-2003-254780, it is possible to perform self-diagnosis to determine whether there exists a malfunction that fixes a sensor output signal to a certain voltage. However, the rotation detection apparatus cannot perform self-diagnosis to determine whether there exists a failure, e.g., the decrease in sensitivity or the presence of the offset caused by failure or aging of the MR element and the bias magnet. Further, since the rotation detection apparatus includes multiple magnetic sensors, manufacturing cost is high.

SUMMARY OF THE INVENTION

In view of the above and other difficulties, it is an objective of the present invention to provide a rotation detection apparatus that can perform self-diagnosis to determine whether there exists a failure such as a sensitivity reduction failure, an offset failure and the like.

According to a first aspect of the present invention, there is provided a rotation detection apparatus for detecting a rotation state of a gear. The rotation detection apparatus includes a magnetic sensor, a magnetic filed generation unit, a driving unit, and a self-diagnosis unit. The magnetic sensor includes: a bias magnet configured to generate a bias magnetic field extending toward the gear; and a magnetic-electric conversion element disposed in the bias magnetic field and configured to sense a change of a direction of the bias magnetic field acting thereon, wherein rotation of the gear changes the direction of the bias magnetic field. The magnetic filed generation unit is disposed in a vicinity of the magnetic-electric conversion element, and is configured to generate a diagnosis use magnetic field extending toward the magnetic-electric conversion element. A direction of the diagnosis use magnetic field is different from that of the bias magnetic field. The driving unit is configured to apply an electric current to the magnetic filed generation unit to drive the magnetic filed generation unit when the gear is in an stationary state. The self-diagnosis unit is configured to diagnose the magnetic sensor to determine whether the magnetic sensor has a failure. The self-diagnosis unit diagnoses the magnetic sensor based on an output signal from the magnetic-electric conversion element that is subjected to a superposition magnetic field formed by a superposition of the bias magnetic field and the self-diagnosis use magnetic field.

According to the rotation detection apparatus, it is possible to diagnose a magnetic sensor to determine whether the magnetic sensor has a failure such a sensitivity reduction failure, an offset failure and the like.

According to a second aspect of the present invention, there is provided a rotation detection apparatus for detecting a rotation state of a rotatable object by utilizing magnetic field perturbation caused by the rotatable object. The rotation detection apparatus includes a magnetic sensor, a magnetic field direction change unit, and a diagnosis unit. The magnetic sensor includes: a magnetic filed generator configured to generate a magnetic filed extending toward the rotatable object; and a magnetic-electric conversion element configured to sense the magnetic filed acting thereon and configured to output a sensing signal. A level of the sensing signal is changeable in accordance with changing a direction of the magnetic field at the magnetic-electric conversion element. The magnetic field direction change unit is configured to change the direction of the magnetic filed when the rotatable object is in a stationary state, and thereby causes the magnetic-electric conversion element to output a diagnosis signal. The diagnosis unit includes: a memory part storing therein reference information, which includes information about a waveform of the diagnosis signal that the magnetic sensor in a normal state is to output; a diagnosis information acquisition part configured to receive the diagnosis signal from the magnetic sensor and configured to extract diagnosis information from the received diagnosis signal, the diagnosis information including information about a waveform of the received diagnosis signal; and a diagnosis determination part configured to diagnose the magnetic sensor to determine whether the magnetic sensor has a failure, based on the reference information and the diagnosis information.

According to the rotation detection apparatus, it is possible to diagnose a magnetic sensor to determine whether the magnetic sensor has a failure such a sensitivity reduction failure, an offset failure and the like.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EXEMPLARY EMBODIMENTS

A rotation detection apparatus 100 according to exemplary embodiments is described below with reference to the accompanying drawings. The rotation detection apparatus 100 can be used for detecting a rotation state of a rotatable object, e.g., a revolution of a gear engaging with a crankshaft of an engine of a vehicle.

(First Embodiment)

Figure 1:
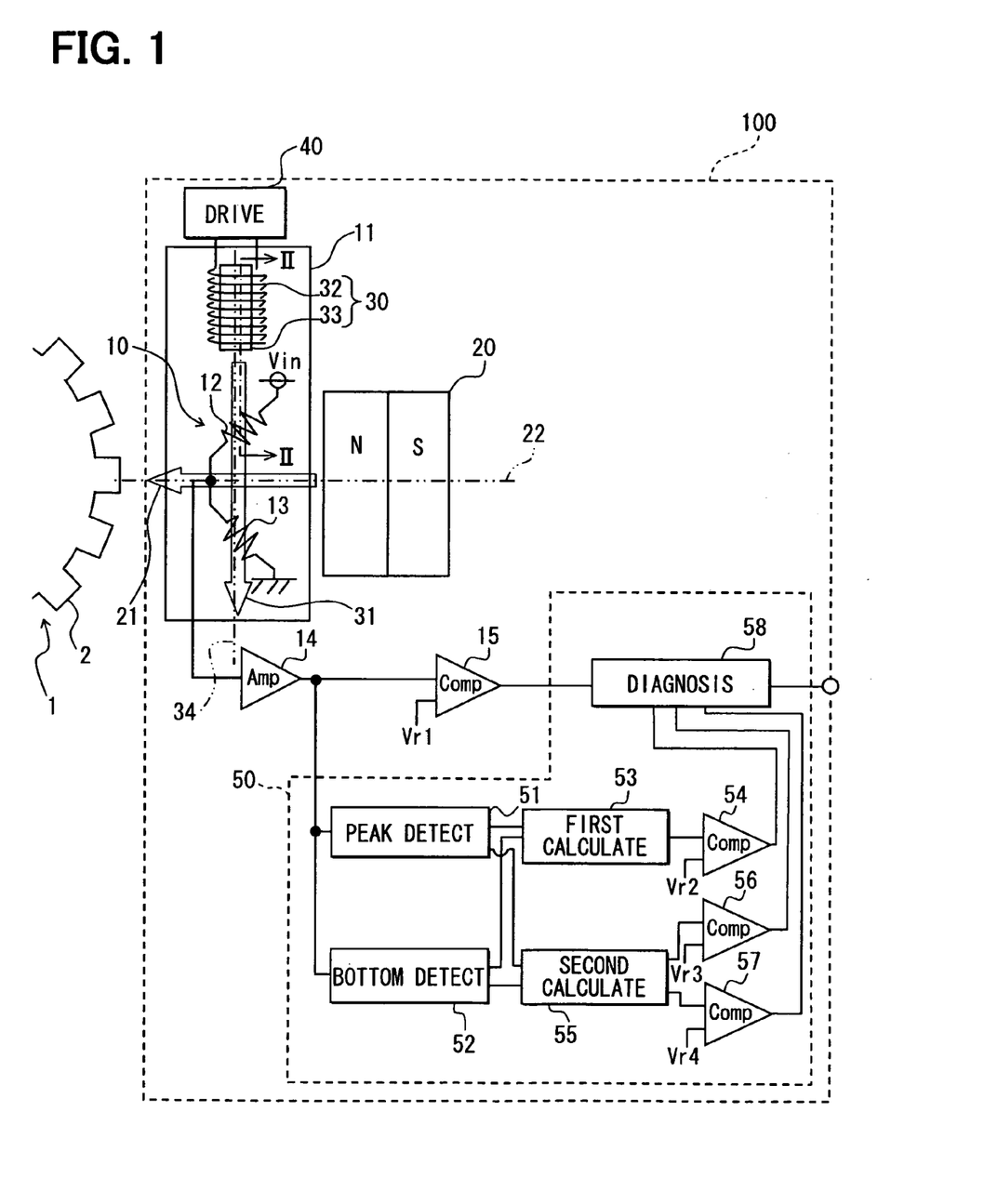
FIG. 1 is a diagram illustrating a configuration of a rotation detection apparatus according to a first embodiment.

As shown in FIG. 1, the rotation detection apparatus 100 of the present embodiment includes a magnetic sensor, which has a bias magnet 20 and a magnetic detection unit 10. The bias magnet 20 generates a bias magnetic field 21 extending toward gear teeth 2 of a gear 1, which is an example of a detection target object. The magnetic detection unit 10 includes a magnetic-electric conversion element for converting a change in direction of the bias magnetic field 21 into an electric signal. The change of the direction of the bias magnetic field 21 results from rotation of the gear teeth 2 located at a periphery of the gear 1.

As shown in FIG. 1, the magnetic detection unit 10 includes two magnetoresistive (MR) elements 12, 13 arranged on a substrate 11. The MR elements 12, 13 are formed through: depositing a Ni—Co material or Ni—Fe material on the substrate 11 by sputtering or vapor deposition; and patterning the deposited layer. Thereby, the MR element 12, 13 is formed in a comb shape where layers are successively folded into connected layers along longer sides and shorter sides thereof. The MR elements 12, 13 are arranged generally symmetrical to each other with respect to an axis of symmetry. Longitudinal directions of the MR elements 12, 13 are inclined in different directions at an angle of 45 degrees with respect to the axis of symmetry and are generally perpendicular to each other.

One end of the MR element 12 is connected with a power supply, and the other end of the MR element 12 is connected with one end of the MR element 13. The other end of the MR element 13 is grounded. The MR elements 12, 13 are bridge connected in series between the power supply and ground (GND). A pair of the above MR elements 12, 13 is included in the magnetic detection unit 10. When a predetermined voltage Vin is applied across a series circuit of the two MR elements 12 and 13, a voltage at a line interconnecting between the two MR elements 12, 13 provides a sensing signal, which is also referred to hereinafter as a sensor output.

The bias magnet 20 is disposed so as to face a periphery of the gear 1. The bias magnet 20 has a central axis, which generally matches a magnetic center line 22 of the bias magnetic filed when the gear 1 is absent. The magnetic center line 22 can be defined as a region in which magnetic lines of force extends straight. Thus, the magnetic center line 22 of the bias magnetic field 21 in the absence of the gear 1 can be used as a reference line, which is simply referred to also as the magnetic center line 22. Further, the bias magnet 20 is disposed so that magnetic center line 22 of the bias magnetic field 21 matches the axis of symmetry, with respect to which the MR element are arranged symmetrical to each other. The bias magnet 20 has an N pole at one end face thereof closer to the gear 1, and has the S pole at the other end face thereof distant from the gear 1. From the N pole of the bias magnet 20, the bias magnetic field 21 extends toward the magnetic detection unit 10, and extends through the MR elements 12, 13. In FIG. 1, a direction of the bias magnetic field 21 is shown as an outline arrow.

As shown in FIG. 1, the magnetic sensor faces the gear 1, which is made of a magnetic material. The magnetic sensor is spaced apart from the gear teeth 2 of the gear 1 by a predetermined distance. The gear 1 is fixed to a rotation axis and is rotatable in synchronization with rotation of the rotation axis. The rotation axis is, for example, a crankshaft of an engine. When the gear 1 is rotating, tips and roots of the gear teeth 2 pass across lines of force of the bias magnetic field 21, and as a result, a direction of the bias magnetic field 21 varies with respect to the magnetic center line 22 in a predetermined deflection range. The direction change of the bias magnetic field 21 leads to a resistance change of the MR element 12, 13, which results in a change of the sensor output. In the magnetic sensor, an operational amplifier 14 amplifies the sensor output, and a comparator 15 compares the amplified sensor output to a reference voltage Vr1 and binarizes the sensor output in accordance with an obtained magnitude relation, thereby producing a binarized signal. The binarized signal is inputted to a diagnosis determination unit 58 where it is determined whether the magnetic sensor is normal. When it is determined that the magnetic sensor is normal, the binarized signal is outputted to an external electrical control unit (ECU), so that the rotation speed of the gear 1 is determined based on a frequency of the binarized signal, which corresponds to a rotation speed of the gear 1. More specifically, the rotation speed of the gear 1 is determined through measuring the frequency of the binarized signal having a pulse form, or counting the number of pulses per a predetermined period. Refer to Japanese Unexamined Patent Application Publication No. 2001-153683 or Japanese Patent No. 3988316, for the above magnetic sensor including the bias magnet 20 and the magnetic detection unit 10 with the MR element.

The rotation detection apparatus 100 detects the rotation speed of the gear 1 based on the change in direction of the bias magnetic field 21 caused by the passage of the tips and roots of the gear teeth 2 of the gear 1 through the bias magnetic filed. In the course of mounting the rotation detection apparatus 100 to a vehicle or in the course of using the magnetic sensor, the magnetic detection unit 10 or the bias magnet 20 may have a positioning displacement, a failure or ageing, which result in sensitivity reduction of the sensor output, sensitivity reduction of an output from the operational amplifier 14, or an offset from a voltage to be outputted in the normal state. When the sensitivity reduction or the offset exists, it becomes difficult to perform high accuracy rotation speed detection.

In view of the above difficulty, the rotation detection apparatus 100 of the present embodiment is configured to diagnose the magnetic sensor when the gear 1 is in a stationary state. The rotation detection apparatus 100 further includes: a magnetic field generation unit 30, a driving unit 40 and a self-diagnosis circuit 50, as shown in FIG. 1. The magnetic field generation unit 30 can function as a magnetic field generation means or unit, and can generate a diagnosis use magnetic field 31, which extends toward the magnetic detection unit 10 and has a direction different from that of the bias magnetic field 21. The driving unit 40 can function as a driving means or unit, and can apply an electric current to the magnetic field generation unit 30 when the gear 1 is in the stationary state. In the stationary state of the gear 1, the self-diagnosis circuit 50 can diagnose the magnetic sensor to determine whether the magnetic sensor has a failure, or whether the magnetic detection unit 10 or the bias magnet 20 has a failure. The self-diagnosis circuit 50 diagnoses the magnetic sensor based on the sensor output from the magnetic sensor that is subjected to a superposition magnetic field formed by the bias magnetic field 21 and the diagnosis use magnetic field 31. The self-diagnosis circuit 50 can function as a self-diagnosis means or unit.

As shown in FIG. 1, the magnetic field generation unit 30 includes a core 33 made of a soft magnetic material and a coil 32 winding around the core 33. The coil 32 and the core 33 are disposed on the substrate 11 such that a central axis 34 extends parallel to a surface of the substrate 11 and extends generally perpendicular to the magnetic center line 22. Hence, in the stationary state of the gear 1, the magnetic field generation unit 30 can generate the diagnosis use magnetic field 31 whose direction at the magnetic detection unit 10 is generally parallel to the surface of the substrate 11, different from the direction of the bias magnetic field 21 and generally perpendicular to the magnetic center line 22 of the bias magnetic field 21. By switching a direction of the electric current applied to the coil 32, it is possible to switch a magnetic pole at one end of the magnetic filed generation unit 30 closer to the magnetic detection unit 10. The magnetic detection unit 10 and the magnetic field generation unit 30 are integrated into the substrate 11.

Figure 2:
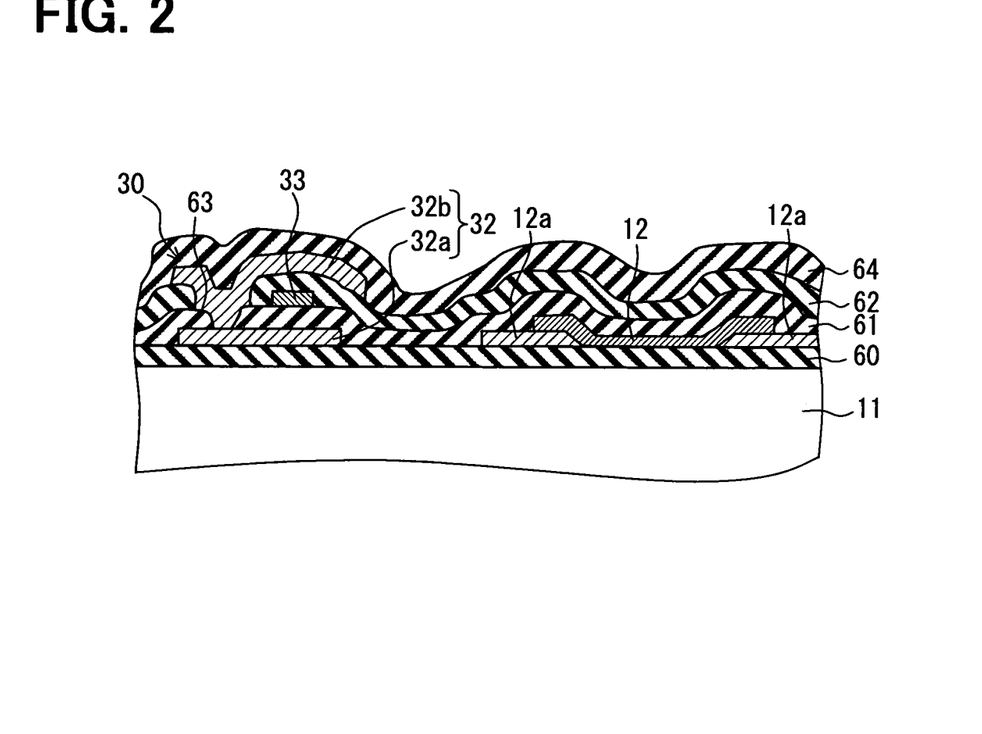
FIG. 2 is a cross sectional diagram taken along line II-II in FIG. 1.

A configuration of the substrate 11 is described below with reference to FIG. 2. The substrate 11 is made of silicon. A thermally oxidized film 60 functioning as a field oxide film is formed on a surface of the substrate 11. On the thermally oxidized film 60, an aluminum layer is deposited by sputtering or vacuum deposition. The aluminum layer is patterned so as to form multiple lower conductors 32a, which are arranged parallel to each other, and the number of which is equal to or corresponds to the winding number of the coil 32. In the same layer of the lower conductors 32a, a wiring part 12a for establishing connection to a power supply, GND, and another MR element (corresponding to the MR element 13 in a case of FIG. 2) is formed by patterning the aluminum layer. On the wiring part 12a, the MR elements 12, 13 (see the MR element 12 in FIG. 2) are formed through, for example, depositing a Ni—Co material by sputtering or vapor deposition, and patterning the deposited layer. A lower interlayer insulating film 61 is formed so as to cover the lower conductors 32a, the wiring part 12a, and the MR elements 12, 13. The lower interlayer insulating film 61 may be a silicon oxide film. On a part of the interlayer insulating film 61 above the lower conductors 32a, the core 33 is formed through depositing a permalloy film by sputtering or vacuum deposition and patterning the deposited permalloy film. An upper interlayer insulating film 62, which may be a silicon oxide film, is formed so as to cover the core 33. Connection holes 63 are selectively formed in the interlayer insulating films 61, 62, and are filled with aluminum. On a part of the interlayer insulating film 62 above the lower conductors 32a, an aluminum layer is deposited by sputtering or vacuum deposition. The deposited aluminum layer is patterned so as to form multiple upper conductors 32b, the number of which corresponds to or is equal to the wiring number of the coil 32. A passivation film 64 is formed so as to cover the upper conductors 32b. Via the connection holes 63, ends of each lower conductor 32a are respectively connected with ends of corresponding one of the upper conductors 32b, thereby, forming the coil 32. In the above, the magnetic field generation unit 30 and the magnetic detection unit 10 are formed in the same substrate 11, or, in the same chip.

When the gear is in the stationary state, the driving unit 40 applies a time varying electric current to the magnetic field generation unit 30 to generate the time-varying diagnosis use magnetic field 31, so that: the bias magnetic filed 21 and the diagnosis use magnetic field 31 form a superposition magnetic field whose direction with respect to the longitudinal direction of each MR element 12, 13 varies with time; and the magnetic sensor can output a time-varying sensor output containing a maximum value (a peak value) and a minimum value (a bottom value). The maximum value and the minimum value are possible sensor output values that are determinable based on a relationship between the direction of the superposition magnetic field and the longitudinal directions of the MR elements 12, 13. The driving unit 40 is configured to function as an AC power supply that applies an alternating current having sinusoidal waveform to the magnetic field generation unit 30 when the rotation of the gear 1 is in the stationary state, so that the sensor output contains the peak value and the bottom value. The alternating current to be applied is determinable based on: the deflection range of the direction of bias magnetic filed 21 with respect to the magnetic center line 22 when the gear is rotating, or in other words, a variation range of an angle between the direction of the bias magnetic filed 21 and the directions of the MR elements.

As shown in FIG. 1, the self-diagnosis circuit 50 binarizes a potential difference $\Delta V$ between the peak and bottom values of the sensor output that has been amplified in the operational amplifier 14 with reference to a predetermined reference voltage Vr2, thereby producing a binarized signal. The self-diagnosis circuit 50 also binarizes a middle voltage $V_{mid}$ of the peak and bottom values with reference to a predetermined reference voltage Vr3, thereby producing a binarized signal. Further, the self-diagnosis circuit 50 further binarizes the middle voltage $V_{mid}$ with reference to a predetermined reference voltage Vr4, thereby producing a binarized signal. Based on the above binarized signals, the self-diagnosis circuit 50 diagnoses the magnetic sensor to determine whether the magnetic sensor (e.g., the magnetic detection unit 10 and the bias magnet 20) has a sensitivity reduction failure, an offset failure of and the like.

More specifically, the sensor output amplified by the operational amplifier 14 is inputted to a peak detection unit 51 and a bottom detection unit 52 of the self-diagnosis circuit 50. The peak and bottom detection units 51, 52 detect the peak and bottom values of the sensor output, respectively. The peak and bottom detection units 51, 52 may respectively include a peak hold circuit and a bottom hold circuit. A first calculation unit 53 subtracts the bottom value from the peak value to obtain the potential difference ΔV, i.e., an output difference, between the peak and bottom values. The comparator 54 compares the potential difference ΔV to the reference voltage Vr2, and generates the binarized signal based on a resultant magnitude relation. The binarized signal is inputted to the diagnosis determination unit 58. Based on the binarized signal, the diagnosis determination unit 58 determines whether the magnetic sensor has a sensitivity reduction failure. That is, the peak detection unit 51, the bottom detection unit 52, the first calculation unit 53, the comparator 54 and the diagnosis determination unit 58 provide a self-diagnosis function for checking the presence of the sensitivity reduction failure.

The second calculation unit 55 calculates the middle voltage $V_{mid}$ between the peak value and the bottom value, and the comparator 56 compares the middle voltage $V_{mid}$ to the reference voltage Vr3 and generates the binarized signal based on a resultant magnitude relation. The binarized signal is inputted to the diagnosis determination unit 58. Further, the comparator 57 compares the middle voltage $V_{mid}$ to the reference voltage Vr4 and generates the binarized signal based on a resultant magnitude relation. The binarized signal is inputted to the diagnosis determination unit 58. The reference voltages Vr3 and Vr4 are respectively set slightly lager than and slightly smaller than the middle voltage for the case of the absence of the sensitivity reduction failure and the offset failure in the magnetic sensor. Based on the above two binarized signals, the diagnosis determination unit 58 determines whether the magnetic sensor has the offset failure. That is, the peak detection unit 51, the bottom detection unit 52, the second calculation unit 55, the comparators 56, 57 and the diagnosis determination unit 58 provide a self-diagnosis function for checking the presence of the off set failure.

Figure 3:
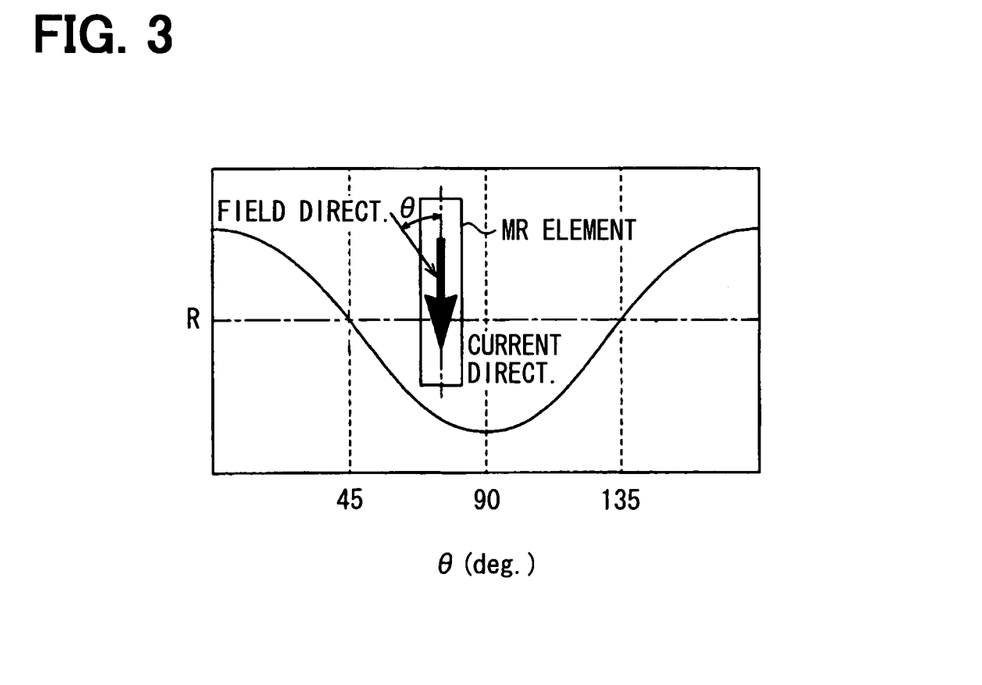
FIG. 3 is a graph illustrating resistance of an MR element as a function of direction of electric current flowing through the MR element.
Figure 4A:
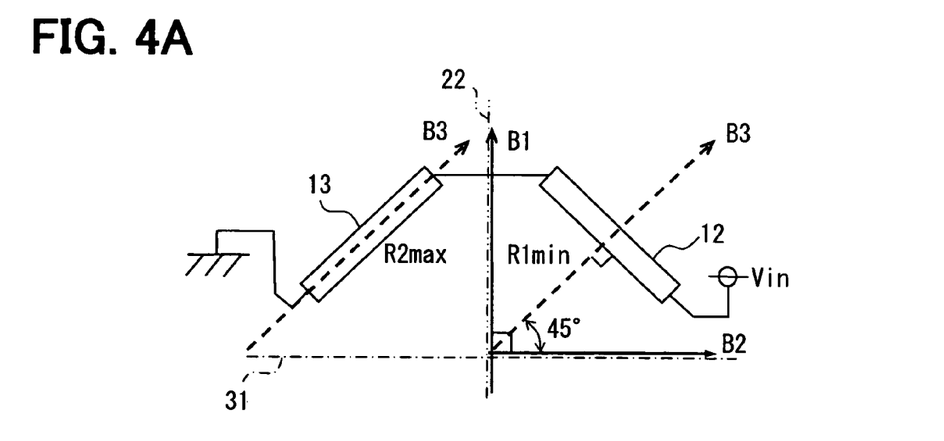
FIG. 4A is a diagram illustrating a superposition magnetic filed formed by a bias magnetic filed and diagnosis use magnetic filed, the super position magnetic filed being inclined clockwise at an angle of 45 degrees with respect to a magnetic center line.
Figure 4B:
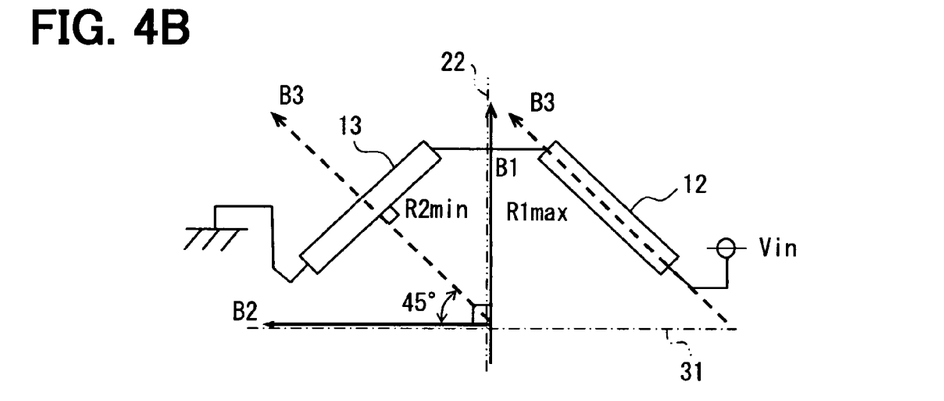
FIG. 4B is a diagram illustrating a superposition magnetic filed inclined counterclockwise at an angle of 45 degrees with respect to a magnetic center line.
Figure 5:
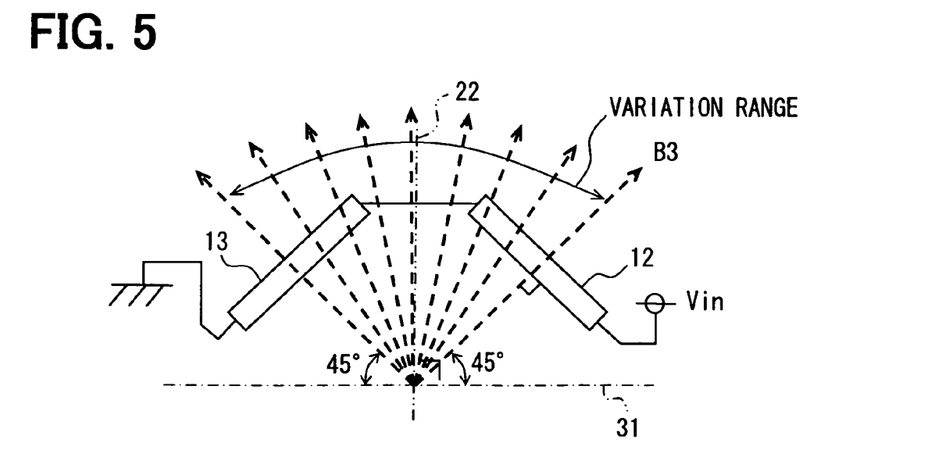
FIG. 5 is a diagram illustrating a variation range of a direction of a superposition magnetic filed.
Figure 6:
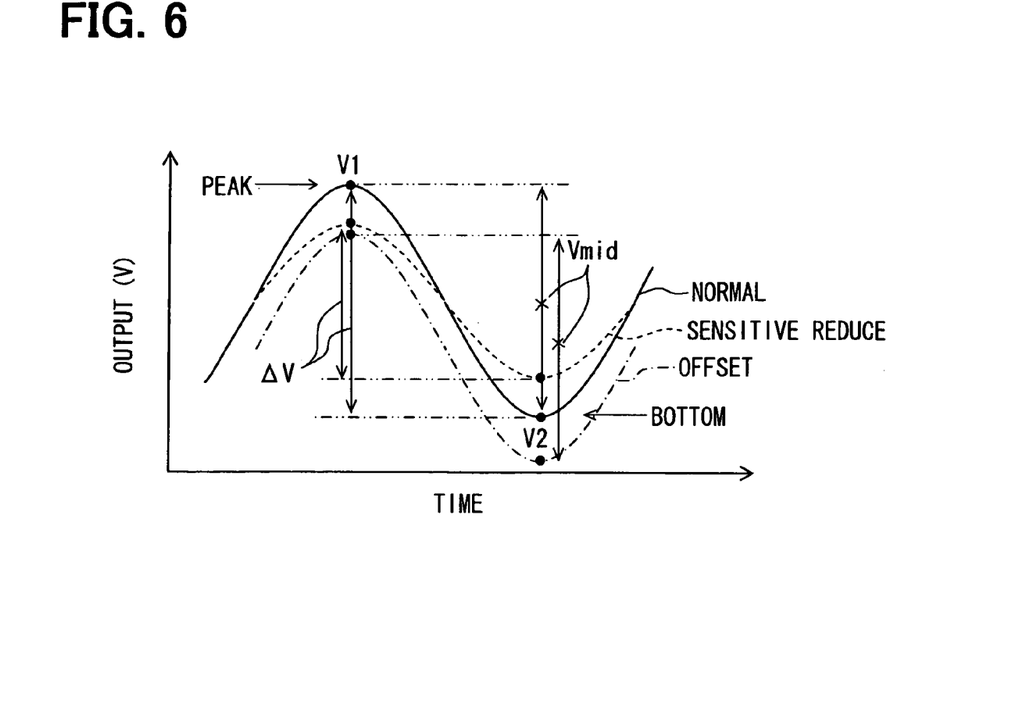
FIG. 6 is a graph illustrating sensor outputs in a normal state, a sensitivity reduction state and an offset state.
Figure 7:
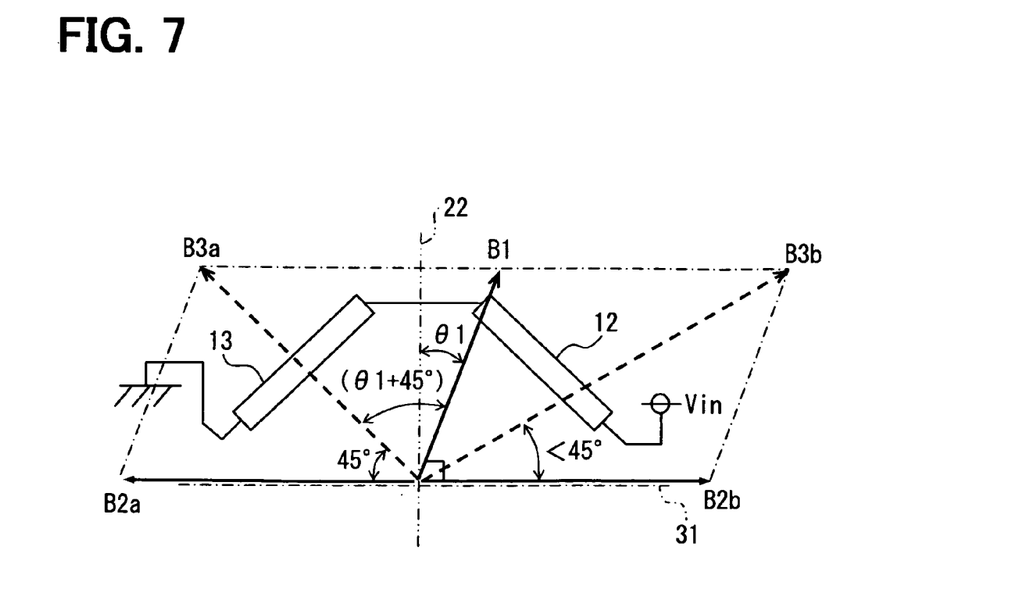
FIG. 7 is a diagram associated with determining an electric current for forming a superposition magnetic filed.
Figure 8:
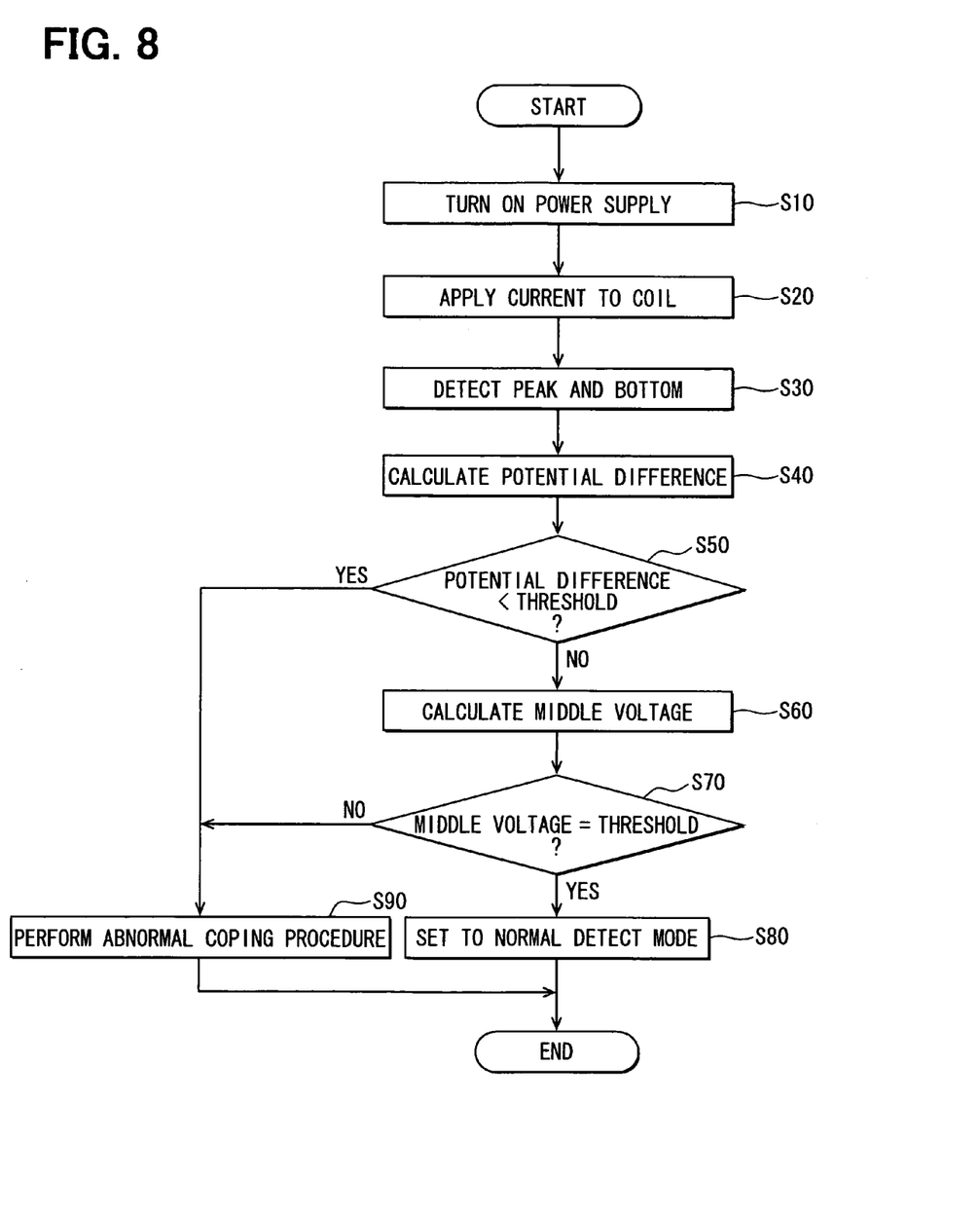
FIG. 8 is a flowchart associated with a first self-diagnosis method.

Explanation is given below on a self-diagnosis principal and a self-diagnosis meted for use in the above configured rotation detection apparatus 100. FIG. 3 is a graph showing resistance R as a function of angle θ between a direction of an electric current flowing through an MR element and a direction of a magnetic field acting on the MR element. Using the angle θ, the resistance R can be expressed as $R = R_{para} \cos^2 \theta + R_{vert} \sin^2 \theta$ where the $R_{para}$ is a resistance that is given when the direction of an electric current is parallel to that of the magnetic field, and the $R_{vert}$ is a resistance that is given when the direction of an electric current is perpendicular to that of the magnetic field. FIGS. 4A and 4B are diagrams each illustrating a direction of a superposition magnetic field formed by a bias magnetic field 21 and a diagnosis use magnetic field 31. In FIG. 4A, the direction of the superposition magnetic field is inclined clockwise at an angle of 45 degrees with respect to the magnetic center line 22. In FIG. 4B, the direction of the superposition magnetic field is inclined counterclockwise at an angle of 45 degrees with respect to the magnetic center line 22. FIG. 5 is a diagram illustrating a variation range of the direction of the superposition magnetic field required to detect the peak value and the bottom value. FIG. 6 is a diagram illustrating sensor outputs in a normal state, a sensitivity reduction failure state and an offset failure state. FIG. 7 is a diagram associated with a method of providing an electric current that causes the direction of the superposition magnetic field to be in the range shown in FIG. 5. FIG. 8 is a flow chart associated with a self-diagnosis method.

First, description is given to a basic characteristic of the MR elements 12, 13 of the magnetic detection unit 10. When the MR element 12, 13 is subjected to a magnetic field whose direction is inclined at an angle θ with respect to a direction of an electric current flowing through the MR element 12, 13, a resistance of the MR element changes as exemplified in FIG. 3. When the angle θ is 90 degrees or 270 degrees, the MR element 12, 13 has a minimum resistance $R_{min}$. When the angle θ is 0 degree or 180 degrees, the MR element 12, 13 has a maximum resistance $R_{max}$. When the angle θ is 45 degrees or 135 degrees, the middle voltage $V_{mid}$ between a maximum value and a minimum values is provided.

A resistance of the MR element 12, which is provided on a power supply side, is denoted by R1. A resistance of the MR element 13, which is provided on a GND side, is denoted by R2. According to the above notations, the sensor output from the magnetic sensor can be expressed as $$V_{out} = V_{in} R2/(R1+R2). \quad \text{Eq.}(1)$$

Herein, a magnetic vector of the bias magnetic field 21 is expressed as a bias magnetic vector B1, a magnetic vector of the diagnosis use magnetic filed 31 is expressed as a diagnosis magnetic vector B2, and a magnetic vector of the superposition use magnetic field is expressed as a superposition magnetic vector B3 (=B1+B2).

According to the rotation detection apparatus 100 having the above configuration, the resistance R1 of the MR element 12 has the minimum value $R1_{min}$ when an angle between the longitudinal direction of the MR element 12 and the superposition magnetic vector B3 is 90 degrees, in other words, when the superposition magnetic vector B3 is inclined clockwise at an angle of 45 degrees with respect to the magnetic center line 22 and the central axis 34 of the coil 32 as is shown in FIG. 4A. In the above case, since the MR elements 12 and 13 are arranged generally symmetrical to each other with respect to the magnetic center line 22 and are generally perpendicular to each other, an angle between the longitudinal direction of the MR element 13 and the superposition magnetic vector B3 has 180 degrees, and thus, the resistance R2 of the MR element 13 has the maximum value $R2_{max}$. Accordingly, the sensor output has the peak value as the maximum value, as can be found from Eq. (1).

When an angle between the longitudinal direction of the MR element 13 and the superposition magnetic vector B3 is 90 degrees, in other words, when the superposition magnetic vector B3 is inclined counterclockwise at an angle of 45 degrees with respect to the magnetic center line 22 and the central axis 34 of the coil 32 as is shown in FIG. 4B, the resistance R2 of the MR element 13 has the minimum value $R2_{min}$. In the above case, an angle between the longitudinal direction of the MR element 12 and that of the superposition magnetic vector B3 has 0 degree, and thus the resistance R1 of the MR element 12 has the maximum value $R1_{max}$. Accordingly, the sensor output has the bottom value as the minimum value, as can be found from Eq. (1).

When the magnetic sensor is normal, the peak value and the bottom value of the sensor output have certain values that can be determined based on a relationship between the magnetic detection unit 10 and the direction of a magnetic field acting on the magnetic detection unit 10. Thus, the peak value and the bottom value when the magnetic sensor is normal can be used as reference values for self-diagnosis of the magnetic sensor, e.g., for checking the sensitivity reduction failure and the offset failure.

However, it is difficult to perform the self-diagnosis by using a single value of the sensor output. This is because the direction of the bias magnetic vector B1 when the gear 1 is in a stationary state cannot be specified from a single value or a certain voltage of the sensor output. More specifically, a level of the sensor output that corresponds to a creation direction of the bias magnetic filed can vary depending on whether the magnetic sensor is in the normal state, in the sensitivity reduction failure state or in the offset failure state. When the direction of the bias magnetic filed is unclear, it is difficult to form such a diagnosis use magnetic field 31 that justly provides the sensor output with the peak value or the bottom value.

In view of the above difficulties, in the present embodiment, the driving unit 40 applies a time varying electric current to the magnetic field generation unit 30 so that the direction of the superposition magnetic vector B3 continuously varies in a predetermined direction variation range to enable detection of both of the peak and bottom values. More specifically, as shown in FIG. 5, the electric current is applied so that the direction variation range of the superposition magnetic vector B3 contains the direction that is shown in FIG. 4A and that shown in FIG. 4B. In other words, as shown in FIG. 5, to the coil 32 of the magnetic field generation unit 30, the driving unit 40 supplies such a time-variable electric current that causes the direction of the superposition magnetic vector B3 to continuously changes in at least an range between −45 degrees and +45 degrees with respect to the magnetic center line 22. In the above, a positive value of the angle is measured in the clockwise direction. A negative value of the angle is measured in the counterclockwise direction.

When the above-described superposition magnetic field acts on the magnetic detection unit 10, if the magnetic sensor is in the normal state, the sensor output has such waveform that contains a predetermined peak value V1 and a predetermined bottom value V2, as shown by the solid line in FIG. 6. If the magnetic sensor has the sensitivity reduction failure (see the dashed line in FIG. 6) or the offset failure (see the dashed-dot line in FIG. 6), the peak value and the bottom value become different from those V1, V2 in the normal state. For example, when the magnetic sensor has the sensitivity reduction failure, the potential difference ΔV between the peak and bottom values becomes smaller than that in the normal state. In another case, when the magnetic sensor has the offset failure, although the potential difference ΔV between the peak and bottom values is generally equal to that in the normal state, the middle voltage $V_{mid}$ between the peak and the bottom values becomes different from that in the normal state. Accordingly, by detecting at least one of the peak and bottom values, it is possible to diagnose the magnetic sensor to determine whether the sensitivity reduction failure or the offset failure exists, based on the at least one of the peak and bottom values.

In the following, description is given to a manner of determining an electric current to be applied to the magnetic field generation unit 30. A time-variable electric current can be employed as an electric current that continuously changes the direction of the superposition magnetic vector B3. For example, it is possible to employ a time-varying direct current without polarity changes. However, the present embodiment employs an alternating current with polarity changes, so that the direction of the superposition magnetic vector B3 continuously changes in an at least range between −45 degrees and +45 degrees with respect to the magnetic center line 22.

When the gear 1 is rotating, the direction of the magnetic vector B1 of the bias magnetic field 21 changes clockwise and counterclockwise with respect to the magnetic center line 22 in accordance with the rotation of the gear 1. Herein, a maximum absolute deflection angle of the magnetic vector B1 with respect to the magnetic center line 22 is denoted by θ1. FIG. 7 illustrates a case where the direction of the magnetic vector B1 is inclined clockwise at the maximum deflection angle θ1. The maximum deflection angle θ1 can be determined based on a pitch of the gear teeth 2 of the gear 1 and a positional relationship between the gear 1 and the MR elements 12, 13 etc., when the diagnosis use magnetic filed 31 is absent. A larger electric current is required to form a larger angle between the direction of the superposition magnetic vector B3 and that of the bias magnetic vector B1.

Among the electric current applied to the magnetic field generation unit 30 to form the superposition magnetic filed whose direction is in the range between −45 degrees and +45 degrees, the electric current has a largest value when the bias magnetic vector B1 is inclined clockwise at the maximum deflection angle θ1 with respect to the magnetic center line 22 and when the superposition magnetic vector B3 is formed so as to be inclined counterclockwise at an angle of 45 degrees with respect to the magnetic center line 22, as shown in FIG. 7. Among the diagnosis magnetic vector B2 for forming the superposition magnetic vector B3 whose direction is in the range between −45 degrees and +45 degrees, the diagnosis magnetic vector B2 can have a largest magnitude when the angle of the superposition magnetic vector B3 with respect to the magnetic center line 22 is changed from θ1 into (θ1+45 degrees) via the magnetic center line 22 (the superposition magnetic vector B3 and the diagnosis magnetic vector B2 in the present case are expressed as B3a and B2a, respectively). Accordingly, a maximum magnitude of the alternating electric current is set greater than or equal to such a value that generates the diagnosis magnetic vector B2a, which can change the angle of the superposition magnetic vector B3 from θ1 into (θ1+45 degrees) via the magnetic center line 22. Thereby, it becomes possible to continuously change the direction of the superposition magnetic vector B3 in the range between −45 degrees and +45 degrees with respect to the magnetic center line 22 even if the bias magnetic vector B1 has any direction in the deflection range. Thus, it becomes possible to provide the sensor output whose waveform contains the peak and bottom values. It should be noted that, as shown in FIG. 7, there is a case where the diagnosis magnetic vector B2 becomes B2b whose direction is opposite to B2a and is inclined clockwise at an angle larger than 45 degrees with respect to the magnetic center line 22.

A self-diagnosis method is described below with reference to FIG. 8. When an ignition switch of a vehicle is switched on for instance, a power supply for the magnetic sensor including the MR elements 12, 13 are in ON at S10. At S20, a signal instructing application of an electric current is inputted to the driving unit 40 so that the driving unit 40 applies a predetermined electric current to the coil 32 of the magnetic field generation unit 30.

Accordingly, the magnetic field generation unit 30 generates the diagnosis use magnetic field 31 extending along the central axis of the coil 32 and acting on the MR elements 12, 13. In the above, since the alternating electric current flows through the coil 32, the direction of the superposition magnetic field formed by the bias magnetic field 21 and the diagnosis use magnetic field 31 continuously changes with time in at least the range between −45 degrees and +45 degrees with respect to the magnetic center line 22. Thus, the sensor output has the waveform containing the peak value and thee bottom value. At S30, the peak detection unit 51 and the bottom detection unit 52 of the self-diagnosis circuit 50 detect the peak value and the bottom value, respectively.

At S40, the first calculation unit 53 calculates the potential difference $\Delta V$ between the peak value and the bottom value. At S50, the comparator 54 determines whether the potential difference $\Delta V$ is smaller than a predetermined threshold, which corresponds to the reference voltage Vr2, and the comparator 54 generates the binarized signal based on a result of the above determination. The binarized signal is inputted to the diagnosis determination unit 58, and the diagnosis determination unit 58 determines weather the sensitivity reduction failure exists or not.

When it is determined that the potential difference $\Delta V$ is smaller than the predetermined threshold, it is determined that the sensitivity reduction failure exists, corresponding to "YES" at S50. At S90, the diagnosis determination unit 58 performs a failure coping procedure, such as outputting a signal instructing a notification unit to output warning, outputting a signal for switching an operation mode into an emergency mode, or the like. By performing the failure coping procedure, control of actuators may not use information on the rotation of the gear 1 indicated by the sensor output. It should be noted that the above comparison and determination can also detect a malfunction that causes the sensor output to be fixed to a certain voltage, such as the power supply voltage, the GND voltage and the like. The above malfunction is hereinafter referred to also as an output voltage fixation malfunction or failure.

When it is determined that the potential difference $\Delta V$ is greater than equal to the predetermined threshold, it is determined that the sensitivity reduction failure does exist, corresponding to "NO" at S50. At S60, the second calculation unit 55 calculates the middle voltage $V_{mid}$ from the obtained peak and bottom values. At S70, it is determined whether the middle voltage $V_{mid}$ is generally equal to the predetermined threshold. More specifically, the middle voltage $V_{mid}$ is calculated from the obtained peak and bottom values in the second calculation unit 55. Then, the middle voltage $V_{mid}$ is compared to the reference voltage Vr3 in the comparator 56, and compared to the reference voltage Vr4 in the comparator 57. The comparators 56 and 57 respectively output the binarized signals to the diagnosis determination unit 58, and the diagnosis determination unit 58 determines whether the offset failure exists or not. In the above, the reference voltages Vr3 and Vr4 are respectively set slightly larger than and slightly smaller than the middle voltage $V_{mid}$ that is to be outputted in a state where the magnetic sensor does not have the sensitivity reduction failure and the offset failure. For example, when the middle voltage $V_{mid}$ is in a range between Vr3 and Vr4, it is determined that the middle voltage $V_{mid}$ is generally equal to the predetermined threshold, corresponding to "YES" at S70.

When the middle voltage $V_{mid}$ is generally equal to the predetermined threshold, the diagnosis determination unit 58 determines at S70 that the magnetic sensor does not have the offset failure (see FIG. 6). At S80, the operational mode is set to a normal measurement mode to detect the rotation state of the gear teeth 2 of the gear 1. Until the ignition switch is turned off, the normal measurement mode is kept and the binarized signal is outputted to the external ECU.

When it is determined that the middle voltage $V_{mid}$ is not generally equal to the predetermined threshold, the diagnosis determination unit determines that the magnetic sensor has the offset failure, corresponding to "NO" at S70. At S90, the diagnosis determination unit 58 performs the above-described failure coping procedure.

As described above, the rotation detection apparatus of the present embodiment includes: the magnetic sensor having the magnetic detection unit 10 and the bias magnet 20; the magnetic field generation unit 30 configured to generate the diagnosis use magnetic field 31 extending toward the magnetic detection unit 10 in a direction different from that of the bias magnetic field 21; the driving unit 40 configured to drive the magnetic field generation unit 30 by applying the electric current to the magnetic field generation unit 30 when the gear 1 is in the stationary state; and the self-diagnosis circuit 50 configured to self-diagnose of the magnetic sensor, when the gear 1 is in the stationary state, to determine whether the magnetic sensor is normal based on the sensor output that is outputted when the superposition magnetic filed acts on the magnetic detection unit 10. In the above, the electric current to be applied to the coil 32 of the magnetic filed generation unit 30 is determined so that the waveform of the sensor output contains the peak value and the bottom value. Further, the self-diagnosis circuit 50 is configured to detect the peak and the bottom values contained in the waveform of the sensor output when the electric current is applied, and configured to diagnose the magnetic sensor to determine whether the magnetic sensor is normal based on the detected peak and bottom values. According to the above configuration, based on the peak and bottom values, it is possible to diagnose the magnetic sensor to determine whether the magnetic sensor has a failure such as the sensitivity reduction failure, the offset failure, the output voltage fix failure and the like.

(Modifications of First Embodiment)

The first embodiment can be modified in various ways, examples of which are described below. In the first embodiment, after calculation of the potential difference $\Delta V$ at S40, the potential difference $\Delta V$ is compared to the predetermined threshold at S50. Further, when the potential difference $\Delta V$ is greater than or equal to the predetermined threshold, the middle voltage $V_{mid}$ is calculated at S60, and the middle voltage $V_{mid}$ is compared to the predetermined threshold at S70. Alternatively, the calculation of the middle voltage $V_{mid}$ and the comparison of the middle voltage $V_{mid}$ to the predetermined threshold may be performed prior to or parallel to the calculation of the potential difference $\Delta V$ and the comparison of the potential difference $\Delta V$ to the predetermined threshold.

In the first embodiment, both of the peak and bottom values of the sensor output are detected, and the self-diagnosis is performed to: check the presence of the sensitivity reduction failure, the output voltage fix failure and the like based on the potential difference $\Delta V$ between the peak and bottom values; and check the presence of the offset failure based on the middle voltage $V_{mid}$ between the peak and bottom values. Alternatively, the self-diagnosis may be performed by using only one of the peak and bottom values since both of the peak and bottom values have predetermined values in the normal state of the magnetic sensor. For example, when only the peak value is used, the time-varying electric current to be applied to the magnetic field generation unit 30 may be determined based on the direction relationship between the MR element 12, 13 and the magnetic field acting on the MR element 12, 13 (see FIG. 7), so that the waveform of the sensor output certainly contain the peak value even when the bias magnetic field 21 has any direction in the deflection range. As the above electric current, a time-varying direct current or alternating current may be used. The self-diagnosis circuit 50 may only include the peak detection unit 51, the comparator and the diagnosis determination unit 58 among the above-described units for the self-diagnosis circuit 50. In a case of the sensitivity reduction failure, since the sensor output is generally smaller than the peak value in the normal state, it is possible to diagnose the magnetic sensor to determine whether the sensitivity reduction failure exists in such manner that: the comparator may binarize the peak value detected by the peak detection unit 51 with reference to a predetermined threshold; and the diagnosis determination unit 58 diagnoses the magnetic sensor based on the binarized signal. However, when the waveform of the sensor output in the offset failure state contains a part whose voltage is equal to the peak value, or when the sensor output is fixed to the peak value, it is not possible to diagnose the magnetic sensor to determine whether the magnetic sensor has the above failures based on only the peak value. Thus, it may be preferable to perform diagnose using both of the peak and bottom values. It should be noted that, when both of the peak and bottom values are used, a self-diagnosis manner may not be limited to the use of the potential difference $\Delta V$ and the middle voltage $V_{mid}$.

(Second Embodiment)

Figure 9:
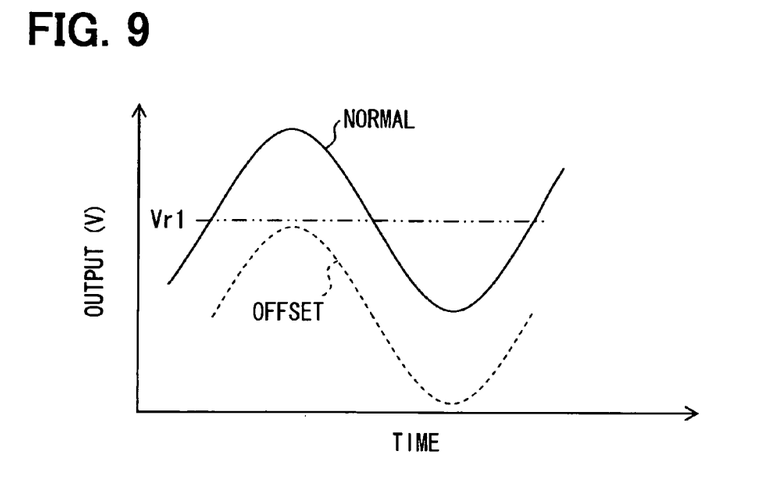
FIG. 9 is a graph illustrating sensor outputs in a normal state and an offset state.
Figure 10:
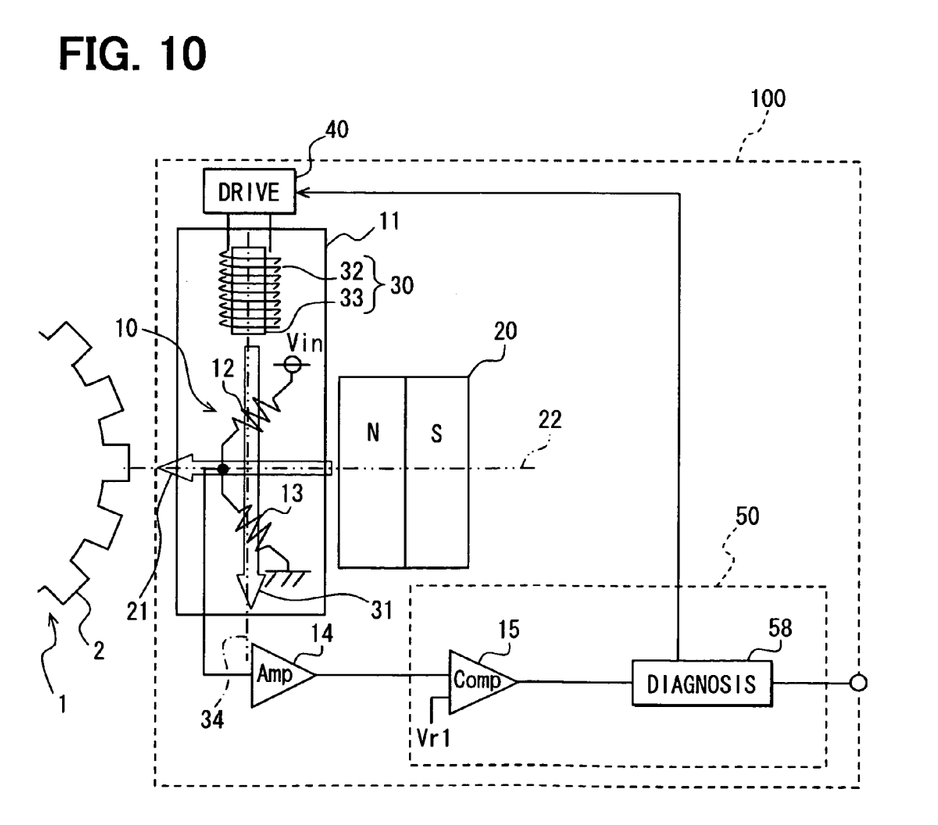
FIG. 10 is a diagram illustrating a configuration of a rotation detection apparatus according to a second embodiment.
Figure 11A:
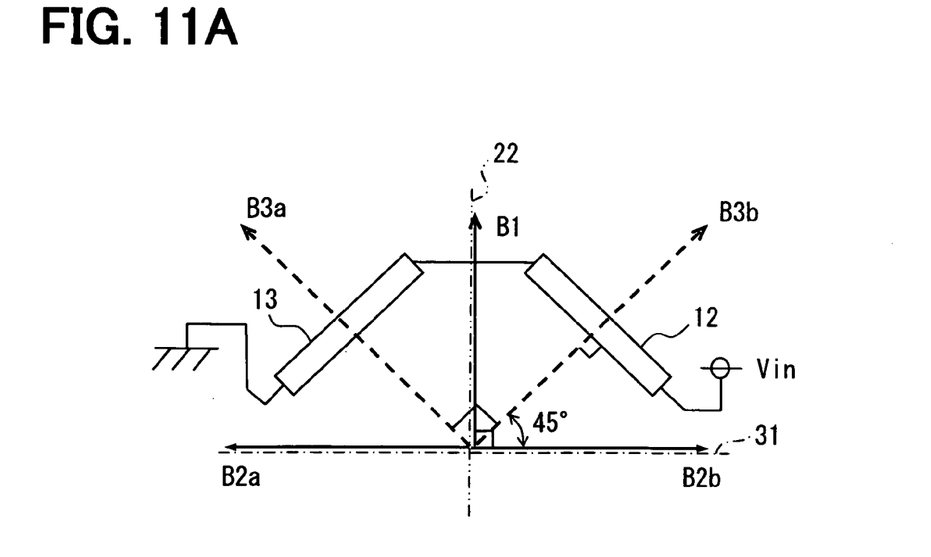
FIG. 11A is a diagram illustrating a direction of a superposition magnetic filed for cases of application of forward and reverse electric currents when a bias magnetic filed is generally parallel to a magnetic center line.
Figure 11B:
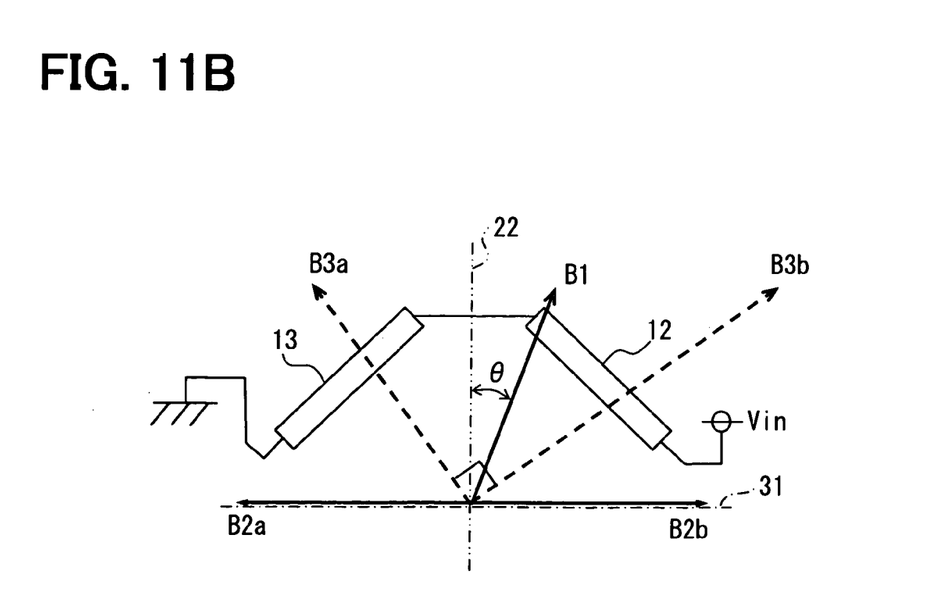
FIG. 11B is a diagram illustrating a direction of a superposition magnetic filed for cases of application of forward and reverse electric currents when a bias magnetic filed is inclined clockwise at angle θ1 with respect to a magnetic center line.
Figure 12:
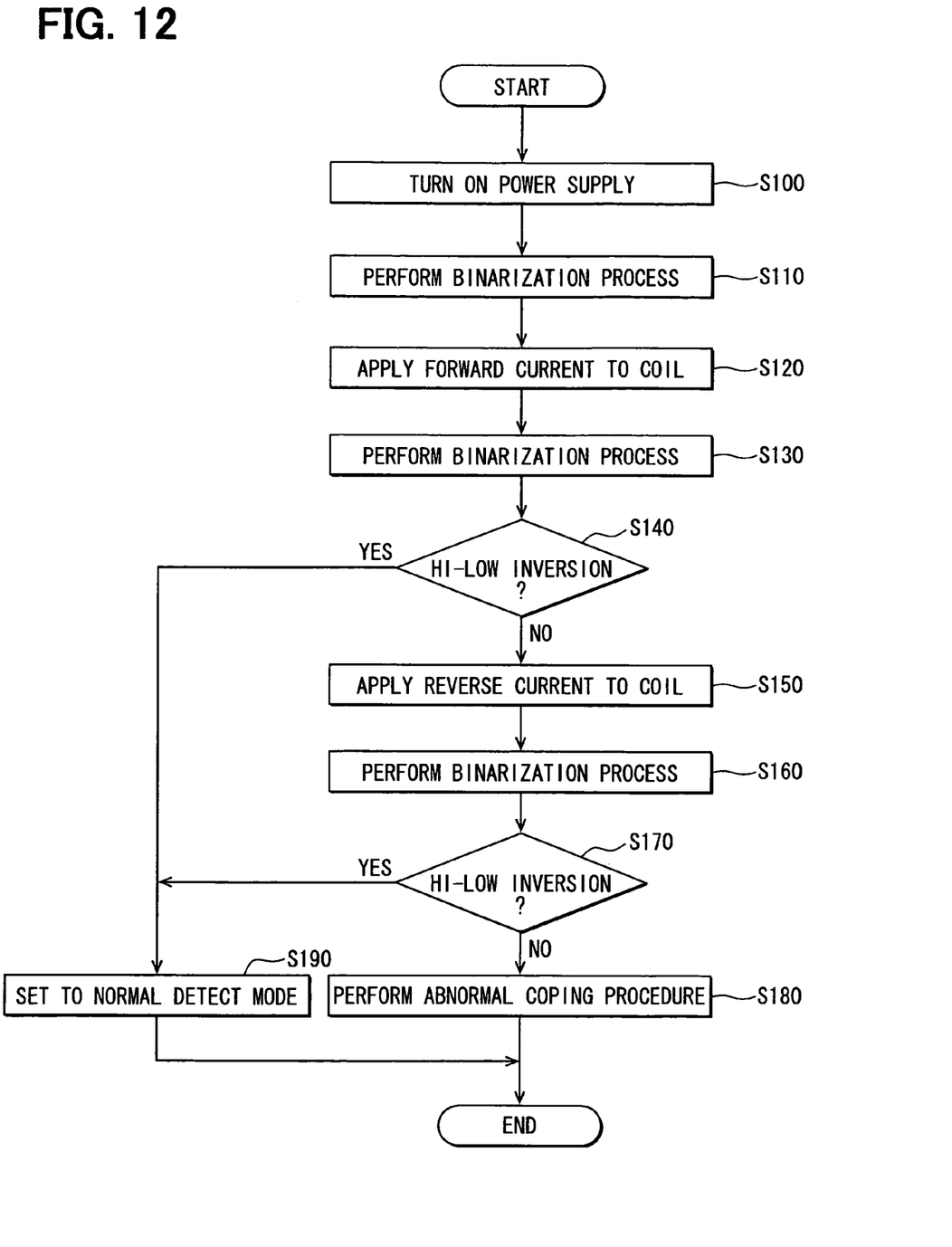
FIG. 12 is a flowchart associated with a second self-diagnosis method.

A second embodiment is described below with reference to FIGS. 9 to 12. FIG. 9 is a graph illustrating sensor output in a normal state and an offset failure state. FIG. 10 is a diagram illustrating a rotation detection apparatus according to the second embodiment. FIGS. 11A and 11B are diagrams each illustrating directions of superposition magnetic fields for cases where a forward electric current and a reverse electric current are applied. In FIG. 11A, the direction of the bias magnetic field 21 is generally parallel to the magnetic center line. In FIG. 11B, the direction of the bias magnetic field 21 is inclined clockwise at an angle $\theta 1$ with respect to the magnetic center line. FIG. 12 is a flow chart of a self-diagnosis method according to the second embodiment. Between the first and second embodiments, like parts refer to like reference numerals.

The rotation detection apparatus 100 of the present embodiment can perform self-diagnosis thereof to determine whether there exists such an offset failure that causes the sensor output to be as a whole smaller than or lager than the reference voltage Vr1 used in the comparator 15, as shown in FIG. 9.

As shown in FIG. 10, the rotation detection apparatus 100 of the present embodiment includes the magnetic detection unit 10, the bias magnet 20 and the magnetic field generation unit 30, configurations of which are generally identical to those of the first embodiment (cf. FIG. 1 also). In the above, the magnetic detection unit 10 and the bias magnet 20 are components of the magnetic sensor, and the magnetic field generation unit 30 generates the diagnosis use magnetic field 31.

To the coil 32 of the magnetic field generation unit 30, the driving unit 40 applies such an electric current that t the diagnosis use magnetic field 31 and the bias magnetic field 21 acting on the MR elements 12, 13 are generally equal in magnitude. Further, the driving unit 40 can switchably apply the forward electric current and the reverse electric current to the coil 32, so that the diagnosis use magnetic field 31 generated due to the forward electric current and that due to the reverse electric current are opposite in direction. Timing of switching the flow direction of the electric current is controlled in accordance with an instruction signal from the diagnosis determination unit 58.

As shown in FIG. 10, the self-diagnosis circuit 50 includes a comparator 15 and a diagnosis determination unit 58. With reference to the predetermined reference voltage Vr1, the comparator 15 binarizes the sensor output amplified in the operational amplifier 14, thereby producing a binarized signal. The diagnosis determination unit 58 diagnoses the magnetic sensor to determine whether the magnetic sensor has a failure based on binarized signals. The diagnosis determination unit 58 includes a memory, a determination portion and a signal generation portion. The memory stores therein the binarized signal outputted from the comparator 15. The determination portion of the diagnosis determination unit 58 compares the two binarized signals, one of which is stored in the memory and the other of which may be inputted; thereby determining whether the offset failure exits based on a level difference between the two binarized signals. The signal generation portion of the diagnosis determination unit 58 generates the instruction signal when the gear 1 is in the stationary state.

Explanation is given below on a self-diagnosis principal and a self-diagnosis method regarding the rotation detection apparatus 100 of the present embodiment. The MR elements 12, 13 are arranged symmetrical to each other about an axis of symmetry, which is represented by the magnetic center line 22 of the bias magnetic field 21. The longitudinal directions of the MR elements 12, 13 are respectively inclined in opposite directions with respect to the magnetic center line 22 and are generally perpendicular to each other. The central axis of the coil 32 of the magnetic field generation unit 30 extends generally parallel to the surface of the substrate 11 and generally perpendicular to the magnetic center line 22.

As shown in FIGS. 11A and 11B, the driving unit 40 applies the electric current to the coil 32 so that a magnitude of the diagnosis magnetic vector B3 becomes generally equal to that of the bias magnetic vector B1. Flow direction of the above electric current applied to the coil 32 switched between the forward and reverse directions, so that the coil 32 can generate the diagnosis magnetic vectors B2a and B2b, directions of which are opposite to each other. When the direction of the bias magnetic vector B1 is generally parallel to the magnetic center line 22 as is illustrated in FIG. 11A, the superposition magnetic vector B3a formed by the diagnosis magnetic vector B2a and the bias magnetic vector B1 is inclined perpendicular to the longitudinal direction of the MR element 13, or, the superposition magnetic vector B3b formed by the diagnosis magnetic vector B2b and the bias magnetic vector B1 is inclined perpendicular to the longitudinal direction of the MR element 12. The directions of the above two superposition magnetic vectors B3a, B3b are generally perpendicular to each other. When the direction of the bias magnetic vector B1 is inclined clockwise at an angle $\theta 1$ with respect to the magnetic center line 22, an angle between the direction of the superposition vector B3a and the longitudinal direction of the MR element 13 does not become 90 degrees, and also, an angle between the direction of the superposition vector B3b and the longitudinal direction of the MR element 12 does not become 90 degrees. However, the directions of the above two superposition magnetic vectors B3a, B3b become generally perpendicular to each other. As similar to the above cases, when the bias magnetic vector B1 has any direction in the deflection range, the directions of the above two superposition magnetic vectors B3a, B3b can be generally perpendicular to each other. Thus, when the electric current with polarity change is applied to the coil 32 so as generate the diagnosis use magnetic filed 31 with polarity change (e.g., the magnetic vectors B2a and B2b), the direction of the superposition magnetic vector B3 is switched with time by 90 degrees. As a result, a level of the sensor output binarized in the comparator 15 is switched between a low level (LOW) and a high level (HI) in accordance with the polarity change of the electric current if the magnetic sensor is in the normal state. If the magnetic sensor has a such a large offset that a level of the sensor output is wholly larger than or wholly smaller than the reference voltage Vr1 as is exemplified in FIG. 9, the sensor output binarized in the comparator 15 constantly becomes a low level (Low) or a high level (HI) with time even when the electric current with the polarity change generates the diagnosis magnetic vector B2a, B2b with opposite directions. Therefore, it becomes possible to diagnose the magnetic sensor to determine whether the offset failure is present based on the level of the binarized sensor output.

Explanation is given blow to a self-diagnosis method with reference to FIG. 12.

When the ignition switch of a vehicle is turned on, a power supply for the magnetic sensor (e.g., the MR elements 12, 13) is turned on at S100. The magnetic sensor is activated accordingly. At S110, the comparator 15 binarizes the sensor output amplified in the operational amplifier 14 using the reference voltage Vr1, thereby producing a first binarized signal. The first binarized signal is inputted to and stored in the diagnosis determination unit 58.

When the first binarized signal is inputted to the diagnosis determination unit 58, the diagnosis determination unit 58 outputs an instruction signal for instructing the driving unit 40 to apply a driving current in the forward direction to the coil 32. At S120, in response to the instruction signal, the driving unit 40 applies a predetermined electric current in the forward direction to the coil 32. Then, the magnetic filed generation unit 30 generates the diagnosis use magnetic field 31, which extends along the central axis of the coil 32 and acts on the MR elements 12, 13. At S130, the operational amplifier 14 amplifies the sensor output which is outputted when the diagnosis use magnetic field 31 acts on the MR elements 12, 13, and the comparator 15 binarizes the amplified sensor output with reference to the reference voltage Vr1, thereby producing a second binarized signal. At S140, the second binarized signal is inputted to the diagnosis determination unit 58, and is compared to the first binarized signal which is pre-inputted and pre-stored in the diagnosis determination unit 58.

When the first and second binarized signals are determined to be different in level, in other words, when the hi-low inversion exists between the first and second binarized signal, corresponding to "YES" at S140, the diagnosis determination unit 58 determines that the magnetic sensor does not have the offset failure. At S190, an operation mode is set to the normal detection mode in which the rotation state of the gear teeth 2 of the gear 1 is detected using the sensor output. Until the ignition switch is turned off, the normal detection mode is maintained and the binarized sensor output is outputted to the external ECU.

When the first and second binarized signals are determined to match each other in level, in other words, when the hi-low conversion does not exist between the first and second binarized signal, corresponding to "NO" at S140, the diagnosis determination unit 58 output an instruction signal to the driving unit 40 so that the driving unit 40 applies the driving current in the inverse direction to the coil 32. Accordingly, at S150, the driving unit 40 applies the electric current in the reverse direction to the coil 32 of the magnetic filed generation unit 30. The magnetic filed generation unit 30 generates the diagnosis use magnetic field 31, which extends along the axis of the coil 32 and acts on the MR elements 12, 13. At S160, the operational amplifier 14 amplifies the sensor output which is outputted when the diagnosis use magnetic field 31 acts on the MR elements 12, 13, and the comparator 15 binarizes the amplified sensor output with reference to the reference voltage Vr1, thereby producing a third binarized signal. At S170, the third binarized signal is inputted to the diagnosis determination unit 58, and compared in level to the first diagnosis signal which is pre-inputted and pre-stored in advance.

When the first and third binarized signals are different in level, in other words, when the hi-low inversion exists between the first and third binarized signals, corresponding to "YES" at S170, the diagnosis determination unit 58 determines that the magnetic sensor does not have the offset failure. At SI90, the operation mode is set to the normal detection mode. Until the ignition switch is turned off, the normal detection mode is maintained and the binarized sensor output is outputted to the external ECU.

When the first and third binarized signals are determined to match each other in level, in other words, when the hi-low inversion does not exist between the first and third binarized signals, corresponding to "NO" at S170, process proceeds to S180. At S180, the diagnosis determination unit 58 performs a failure coping process, such as outputting a signal instructing a notification unit to output warning, outputting a signal instructing the operational mode to switch into an emergency mode. Further, when the failure coping process is performed, or when the operation mode is set to the emergency mode, the information about the rotation state of the gear 1 cannot used for controlling an actuator other than the gear 1. In the above, the electric current in the forward and directions can function as a first electric current and a second electric current, respectively.

Accordingly, the rotation detection apparatus 100 of the present embodiment can self-diagnose to determine whether the magnetic sensor has the offset failure based on the absence of the hi-low inversion between the binarized signals from the comparator 15.

In the above, the rotation detection apparatus 100 performs self-diagnosis using the binarized sensor outputs that are outputted when the diagnosis use magnetic field does not act on the MR elements 12, 13, or, when only the bias magnetic field 21 acts on the MR elements 12, 13. Alternatively, the rotation detection apparatus 100 may perform self-diagnosis of the magnetic sensor to determine whether the magnetic sensor has the offset failure, in such manner that: S110 is skipped; the binarized signal for a case of application of the electric current in the forward direction is stored in the memory; and the binarized signal for a case of application of the electric current in the reverse direction is compared to the binarized signal stored in the memory.

(Modifications)

The above embodiments can be modified in various ways, examples of which are described below.

In the above embodiments, the magnetic field generation unit 30 includes the coil 32 and the core 33. However, a configuration of the magnetic field generation unit 30 is not limited to the above example. For example, the magnetic field generation unit 30 may include the coil 32 but may not include the core 33. Alternatively, in place of the coil 32, the magnetic field generation unit 30 may employ another element that can generate a magnetic field acting on the magnetic detection unit 10.

In the above embodiments, the central axis of the coil 32 of the diagnosis use magnetic field generation unit 30 is generally perpendicular to the magnetic center line 22 of the bias magnetic field 21 and generally parallel to the surface of the substrate 11. However, an orientation of the central axis of the coil 32 is not limited to the above example.

In the above embodiments, the magnetic detection unit 10 has a pair of MR elements arranged in a bridge such that the MR elements 12, 13 are connected in series. However, a configuration of the magnetic detection unit 10 is not limited to the above example. For example, the magnetic detection unit 10 may have two pairs of MR elements arranged in a full bridge, so that the operational amplifier 14 can perform differential amplification. Further, the magnetic detection unit 10 may employ an element other than an MR element. For example, the magnetic detection unit 10 may employ a hall element, a GMR (Giant Magneto Resistance) element or the like.

In the above embodiments, the MR elements 12, 13 of the magnetic detection unit 10 are arranged symmetrical to each other about an axis of symmetry represented by the magnetic center line 22 of the bias magnetic field 21. Further, the longitudinal directions of the MR elements 12, 13 are perpendicular to each other and are respectively inclined clockwise and counterclockwise at an angle of 45 degrees with respect to the magnetic center line 22. However, an arrangement of the MR elements 12, 13 is not limited to the above example.

In the above embodiments, the magnetic detection unit 10 and the magnetic field generation unit 30 are arranged in the same substrate or the same chip. According to the above arrangement, it is possible to high-precisely determine a relative positioning relationship between the longitudinal directions of the MR elements 12, 13 and a direction of the diagnosis use magnetic field 31. Alternatively, the magnetic detection unit 10 and the magnetic field generation unit 30 may be arranged in different chips and may be mounted to the same printed circuit board.

While the invention has been described above with reference to various embodiments thereof, it is to be understood that the invention is not limited to the above described embodiments and constructions. The invention is intended to cover various modifications and equivalent arrangements. In addition, while the various combinations and configurations described above are contemplated as embodying the invention, other combinations and configurations, including more, less or only a single element, are also contemplated as being within the scope of embodiments.

What is claimed is:

1. A rotation detection apparatus for detecting a rotation state of a gear, the rotation detection apparatus comprising:
   a magnetic sensor including:
      a bias magnet configured to generate a bias magnetic field extending toward the gear; and
      a magnetic-electric conversion element disposed in the bias magnetic field and configured to sense a change of a direction of the bias magnetic field acting thereon, wherein rotation of the gear changes the direction of the bias magnetic field;
   a magnetic field generation unit disposed in a vicinity of the magnetic-electric conversion element and configured to generate a diagnosis use magnetic field extending toward the magnetic-electric conversion element, wherein a direction of the diagnosis use magnetic field is different from that of the bias magnetic field;
   a driving unit configured to apply an electric current to the magnetic field generation unit, and thereby to drive the magnetic field generation unit when the gear is in an stationary state; and
   a self-diagnosis unit configured to diagnose the magnetic sensor to determine whether the magnetic sensor has a failure,
   wherein the self-diagnosis unit diagnoses the magnetic sensor based on an output signal from the magnetic-electric conversion element that is subjected to a superposition magnetic field formed by the bias magnetic field and the diagnosis use magnetic field.

2. The rotation detection apparatus according to claim 1, wherein:
   the driving unit applies the electric current having a predetermined time-varying current value to the magnetic field generation unit, so that the magnetic-electric conversion element is subjected to the superposition magnetic field having one of a first direction and a second direction;
   the magnetic-electric conversion element subjected to the superposition magnetic field having the first direction outputs a peak value of the output signal, the peak value being a maximum value of a waveform of the output signal;
   the magnetic-electric conversion element subjected to the superposition magnetic field having the second direction outputs a bottom value of the output signal, the bottom value being a minimum value of the waveform of the output signal;
   the self-diagnosis unit detects one of the peak value and the bottom value that corresponds to the one of the first direction and the second direction; and
   the self-diagnosis unit diagnoses the magnetic sensor based on the one of the peak value and the bottom value.

3. The rotation detection apparatus according to claim 1, wherein:
   the driving unit applies the electric current having a predetermined time-varying current value to the magnetic field generation unit, so that:
      the magnetic-electric conversion element is subjected to the superposition magnetic field having a first direction at a first time; and
      the magnetic-electric conversion element is subjected to the superposition magnetic field having a second direction at a second time; and
      the first time is different from the second time;
   the magnetic-electric conversion element subjected to the superposition magnetic field having the first direction outputs a peak value of the output signal, the peak value being a maximum value of a waveform of the output signal;
   the magnetic-electric conversion element subjected to the superposition magnetic field having the second direction outputs a bottom value of the output signal, the bottom value being a minimum value of the waveform of the output signal;
   the self-diagnosis unit detects the peak value and the bottom value; and
   the self-diagnosis unit diagnoses the magnetic sensor based on the peak value and the bottom value.

4. The rotation detection apparatus according to claim 3, wherein the electric current having the predetermined time-varying current value is an alternating current.

5. The rotation detection apparatus according to claim 4, further comprising:
   a substrate having a surface,
   wherein:
   the magnetic-electric conversion element includes a magneto resistive (MR) element bridge, in which a first MR element and a second MR element are connected in series;
   the first and second MR elements are arranged on the surface of the substrate such that:
      a longitudinal direction of the first MR element is inclined in a clockwise direction at an angle of generally 45 degrees with respect to a magnetic center line of the bias magnetic field;

a longitudinal direction of the second MR element is inclined in a counterclockwise direction at an angle of generally 45 degrees with respect to the magnetic center line of the bias magnetic field; and the longitudinal direction of the first MR element is generally perpendicular to the longitudinal direction of the second MR element;

the direction of the superposition magnetic field at the electric-magnetic conversion element is continuously changed in a variation range between a first angle and a second angle with respect to the magnetic center line;

the first angle is greater than or equal to 45 degrees, the first angle being measured in the counterclockwise direction with respect to the magnetic center line; and the second angle is greater than or equal to 45 degrees, the second angle being measured in the clockwise direction with respect to the magnetic center line.

6. The rotation detection apparatus according to claim 5, wherein:

the magnetic field generation unit includes a coil, an axis direction of which is generally parallel to the surface of the substrate and is generally perpendicular to the magnetic center line.

7. The rotation detection apparatus according to claim 5, wherein:

the self-diagnosis unit calculates a potential difference between the peak value and the bottom value; and the self-diagnosis unit compares the potential difference to a first predetermined threshold.

8. The rotation detection apparatus according to claim 5, wherein:

the self-diagnosis unit calculates a middle voltage between the peak and bottom values; and the self-diagnosis unit compares the middle voltage to a second predetermined threshold.

9. The rotation detection apparatus according to claim 1, further comprising:

a substrate having a surface, wherein:

the magnetic-electric conversion element includes a magneto resistive (MR) element bridge, in which a first MR element and a second MR element are connected in series;

the first and second MR elements are arranged on the surface of the substrate such that:

a longitudinal direction of the first MR element is inclined in a clockwise direction at an angle of generally 45 degrees with respect to a magnetic center line of the bias magnetic field;

a longitudinal direction of the second MR element is inclined in a counterclockwise direction at an angle of generally 45 degrees with respect to the magnetic center line; and the longitudinal direction of the first MR element is generally perpendicular to the longitudinal direction of the second MR element;

the magnetic field generation unit includes a coil, an axis direction of which is generally parallel to the surface of the substrate and is generally perpendicular to the magnetic center line;

the driving unit applies the electric current having a first flow direction to the magnetic field generation unit to generate the diagnosis use magnetic field having a first direction and a predetermined magnitude at the magnetic-conversion element;

the driving unit applies the electric current having a second flow direction to the magnetic field generation unit to generate the diagnosis use magnetic field having a second direction and the predetermined magnitude at the magnetic-conversion element;

the predetermined magnitude of the diagnosis use magnetic field is generally equal to a magnitude of the bias magnetic field at the magnetic-electric conversion element;

the first and second directions of the diagnosis use magnetic field are generally opposite to each other;

the first and second flow directions of the electric current are generally opposite to each other;

the magnetic-electric conversion element outputs the output signal having a first property when the gear is in the stationary state and when the diagnosis use magnetic field is absent;

the self-diagnosis unit binarizes the output signal having the first property with reference to a first predetermined threshold, thereby to generate a first binarized signal;

the magnetic-electric conversion element outputs the output signal having a second property when the driving unit applies the electric current having the first property to the magnetic field generation unit;

the self-diagnosis unit binarizes the output signal having the second property with reference to the first predetermined threshold, thereby generate a second binarized signal;

the magnetic-electric conversion element outputs the output signal having a third property when the driving unit applies the electric current having the second property to the magnetic field generation unit;

the self-diagnosis unit binarizes the output signal having the third property with reference to the first predetermined threshold, thereby generate a third binarized signal;

the self-diagnosis unit determines whether a level of the first binarized signal is equal to that of the second binarized signal; and when it is determined that the level the first binarized signal is equal to that of the second binarized signal, the self-diagnosis unit determines whether the level of the first binarized signal is equal to that of the third binarized signal.

10. The rotation detection apparatus according to claim 1, wherein:

the magnetic-electric conversion element and the magnetic generation unit is arranged on a same chip.

11. The rotation detection apparatus according to claim 1, wherein:

the magnetic-electric conversion element is configured to output a sensor output, wherein a level of the sensor output is changeable in accordance with changing a direction of the superposition magnetic field at the magnetic-electric conversion element.

12. The rotation detection apparatus according to claim 11, wherein:

the driving unit supplies the electric current that continuously changes the direction of the superposition magnetic field so that the magnetic-electric conversion element outputs the sensor output with a waveform having a peak value and a bottom value.

13. The rotation detection apparatus according to claim 11, wherein the driving unit supplies the electric current that switches the direction of the diagnosis use magnetic field between a first direction and a second direction.

* * * * *